United States Patent
Suljanovic et al.

(10) Patent No.: US 11,203,962 B2
(45) Date of Patent: Dec. 21, 2021

(54) METHOD FOR GENERATING A MODEL ENSEMBLE FOR CALIBRATING A CONTROL DEVICE

(71) Applicant: AVL LIST GmbH, Graz (AT)

(72) Inventors: Amra Suljanovic, Graz (AT); Hans-Michael Kögeler, Graz (AT); Stefan Jakubek, Vienna (AT); Nico Didcock, Graz (AT)

(73) Assignee: AVL LIST GmbH, Graz (AT)

( * ) Notice: Subject to any disclaimer, the term of this patent is extended or adjusted under 35 U.S.C. 154(b) by 663 days.

(21) Appl. No.: 15/558,119

(22) PCT Filed: Mar. 11, 2016

(86) PCT No.: PCT/EP2016/055307
§ 371 (c)(1),
(2) Date: Dec. 13, 2017

(87) PCT Pub. No.: WO2016/146528
PCT Pub. Date: Sep. 22, 2016

(65) Prior Publication Data
US 2018/0112580 A1 Apr. 26, 2018

(30) Foreign Application Priority Data

Mar. 13, 2015 (AT) .............. A 50202/2015

(51) Int. Cl.
*G06F 17/10* (2006.01)
*F01N 9/00* (2006.01)
*F02D 41/24* (2006.01)
*G01M 15/10* (2006.01)
*G06Q 10/04* (2012.01)
*G06Q 10/06* (2012.01)
*F02D 41/14* (2006.01)

(52) U.S. Cl.
CPC ......... *F01N 9/005* (2013.01); *F02D 41/2432* (2013.01); *G01M 15/10* (2013.01); *G01M 15/102* (2013.01); *G06Q 10/04* (2013.01); *G06Q 10/067* (2013.01); *F02D 41/1461* (2013.01); *F02D 2041/1433* (2013.01); *F02D 2041/1437* (2013.01)

(58) Field of Classification Search
CPC .. F02D 41/2432; F01N 9/005; G01M 15/102; G06Q 10/04; G06Q 10/067
USPC .......................................................... 703/2
See application file for complete search history.

(56) References Cited

U.S. PATENT DOCUMENTS

2005/0203725 A1  9/2005  Jenny et al.
2014/0188768 A1* 7/2014  Bonissone ............. G06N 20/00
                                                706/12

FOREIGN PATENT DOCUMENTS

WO  2013131836 A2  9/2013

OTHER PUBLICATIONS

Tindle (Cold Engine Emissions Optimization Using Model Based Calibration, (24 pages)). (Year: 2007).*

(Continued)

*Primary Examiner* — Andre Pierre Louis
(74) *Attorney, Agent, or Firm* — Whitmyer IP Group LLC

(57) ABSTRACT

A method for generating a model ensemble that estimates at least one output variable of a physical process as a function of at least one input variable, the model ensemble being formed from a sum of model outputs from a plurality of models that have been weighted with a weighting factor.

15 Claims, 4 Drawing Sheets

(56) References Cited

OTHER PUBLICATIONS

Christoph Hametner, et al.: "Dymanic NOx emission modelling using local model networks" International Journal of Engine Research, Professional Engineering Publishing, GB, pp. 928-933, vol. 15. 6 pages. Published: Dec. 1, 2014.

Vom Fachberiech: "Emission Modelling and Model-Based Optimisation of the Engine Control" Published: Feb. 25, 2013, 188 pages. http://tuprints.ulb.tu-darmstadt.de/3948/1/Emission Modelling and Model-Based Optimisation of the Engine Control-Dissertation Heiko Sequenz.pdf.

Knut-Andreas Lie: "Finite-Element Methods and Numerical Linear Algebra" Published: Jan. 1, 2005, 30 pages. http://www.uio.no/studier/emner/matnat/ifi/INF2340/v05/foiler/sim06.pdf.

Akaike, Hirotogu. "Information Theory and An Extension of the Maximum Likelihood Principle" In Second International Symposium on Information Theory, 1973, 267-281. 15 pages.

Hartmann, Benjamin: "Lokale Modellnetze zur Identifikation und Versuchsplanung nichtlinearer Systeme" Dissertation: Schriftenreihe der Arbeitsgruppe Mess-und Regelungstechnik-Mechatronik, Department Maschinenbau der Universitat Siegen Published: Jan. 24, 2014, 202 pages http://d-mb.info/1050874226/34.

Sung, Alexander, et al.: "Modellbasierte Online-Optimierung in der Simulation und am Motorenprufstand" MTZ—Motortechnische Zeitschrift Published: Jan. 2007, vol. 68, Issue 1, 8 pages. http://www.ra.cs.unituebingen.de/publikationen/2007/OnlineOpti_BMW_m01-07-09.pdf.

Christoph Hametner, et al: "Nonlinear System Identification through Local Model Approaches: Partitioning Strategies and Parameter Estimation 179 0 Nonlinear System Identification through Local Model Approaches: Partitioning Strategies and Parameter Estimation" Published: Jan. 1, 2010; 18 pages http://cdn.intechopen.com/pdrs-wm/11739.pdf.

Austrian Search Report Application No. A50202/2015 dated Mar. 11, 2016 1 Page.

International Search Report and Written Opinion Application No. PCT/EP2016/055307 Completed: Jun. 17, 2016; dated Jun. 24, 2016 13 Pages.

International Search Report and Written Opinion Translation Application No. PCT/EP2016/055307 Completed Date: Jun. 17, 2016; dated Jun. 24, 2016 3 Pages.

\* cited by examiner

METHOD FOR GENERATING A MODEL ENSEMBLE FOR CALIBRATING A CONTROL DEVICE

TECHNICAL FIELD

The present invention relates to a method for generating a model ensemble that estimates at least one output variable of a physical process as a function of at least one input variable, the model ensemble being formed from a sum of model outputs from a plurality of models that have been weighted with a weighting factor.

BACKGROUND

In the development of internal combustion engines, there are legal requirements that must be taken into account with respect to emissions, in particular of NOx, soot, CO, $CO_2$, etc., and with respect to consumption. A combustion engine control device is calibrated for this purpose during development in such a manner that these requirements are met during operation of the combustion engine. Calibration here means that certain parameters of the combustion engine, such as the air/fuel ratio, the recirculation of waste gas in the cylinder, firing intervals, etc., are specified as a function of a particular state of the combustion engine, such as torque, speed, engine coolant temperature, etc. For example, corresponding engine maps are stored in the control device that are readout during operation of the combustion engine in order to identify the control parameters for a particular state. Because of the many influencing variables, calibration is a very time-consuming and expensive process that is primarily carried out on specialized test benches. For this, a combustion engine is mounted on a test bench and connected to a loading machine that simulates specific, predetermined load conditions. In the course of this, predetermined load cycles (driving cycles) are usually run on the test bench. During the load cycles, the emissions values and/or the consumption of the combustion engine are measured as a function of the prevailing state. After evaluation of the recorded measurement values, the control parameters are changed in the control device and the process is repeated until a satisfactory calibration was achieved. The time on the test bench is very expensive, however, and should be reduced as much as possible.

Therefore, methods have been developed to simplify the calibration, in particular to reduce test bench times. These methods are often based on models of the emissions or consumption behaviors of the combustion engine, or on models of a physical process in general. What is required here, therefore, is to determine a sufficiently precise model of the physical process that can then be used for calibration of the control device. Methods for automated model identification of non-linear processes (for example, of NOx emission or of consumption) have already become known, as described in WO 2013/131836 A2, for example. These methods are each based on a predetermined model structure, such as a neural network, a Kriging model or a linear model network. The model structure chosen thus defines model parameters that are determined by the method for automated model identification. Data in the form of measurement values on a test bench are collected for this, and the model is parameterized or trained using these data. Consequently, only a small number of test runs using an actual combustion engine on an actual test bench is necessary. Using the trained model, the influence of particular control parameters on emissions or on consumption can be examined without the need for further test bench tests.

The dissertation by Hartmann B. "Local model networks for identification and test design of non-linear systems," Siegen University January 2014, goes into more detail on linear model networks as model structure. In the case of linear model networks, valid local models are defined in a known way over partial ranges of the input variable range. The output of a linear model network over the whole input range then results from the sum of the outputs of the local models weighted using validity functions. A local model thus estimates only a locally valid output value, and hence only a portion of the output value of the model network.

However, the selection of the best model structure for modeling a specific behavior of a combustion engine (NOx emission, for example) is already ambitious and not immediately obvious.

For this reason, so-called model ensembles have already been employed. Here, different models are trained that are then weighted in order to achieve the best possible estimation for a specific behavior of a combustion engine (emission or consumption, for example). The output of the complete model (of the model ensemble) results from a weighted sum of the outputs of the individual models. The weighting factors must therefore be determined for a model ensemble. A method often used for determining the weighting factors is based on the Akaike Information Criterion, as described in Akaike, H. "Information theory and an extension of the maximum likelihood principle," Proceedings 2nd International Symposium on Information Theory, Budapest 1973, pp. 267-281. Hartmann's dissertation also describes model ensembles using weighting factors according to an Akaike Information Criterion.

The plausibility of a model $M_j$ is evaluated using the Akaike Information Criterion. Thus, for each model $M_j$, the model error $E_j$ and the complexity of model $M_j$ are evaluated in the form $$AIC_j = N \cdot \log \underbrace{MSE_j}_{E_j} + 2 \cdot [\alpha] \cdot p_j.$$

Using model error $E_j$, the deviation of the model output variable $\hat{y}_j$, of model $M_j$ from the actual measured output y of the process is evaluated. In the Akaike Information Criterion AIC, the mean square error $MSE_j$ of model $M_j$ at N different known input variables u of model $M_j$ is used as model error $E_j$. The mean square error $MSE_j$ of the jth model $M_j$ is calculated in well-known manner from $$MSE_j = \frac{1}{N} \sum_{i=1}^{N} (y(u_i) - \hat{y}_j(u_i))^2.$$

Complexity is evaluated in the Akaike Information Criterion simply in the form of the number $p_j$ of the model parameters of the jth model $M_j$. There are also known modifications, for example, in the case of a neural network as a model structure for the jth model $M_j$, the number of effective parameters, that can be calculated according to known methods not more closely detailed here, is often employed for evaluating the complexity. It is also known to weight the complexity using a factor $\alpha$ (indicated in the above equation for $AIC_j$), the so-called risk aversion parameter.

The weighting factors $w_j$ for the individual models $M_j$ are then calculated according to the associated determined plausibility according to the Akaike Information Criterion $AIC_j$ using $$w_j = e^{-\frac{1}{2}AIC_j}$$

and normalized to 1.

The problem with this Akaike Information Criterion AIC is that, although it can be calculated quickly, it is designed for a large number N of known data points (measured output variables y at a specified input variable u). The known data points are thus often also those data points by which the models $M_j$ were trained. Moreover, the model structures (for the number of parameters $p_j$) of models $M_j$ must be known so that the plausibility and thus the weighting factors $w_j$ can be calculated.

For this application, however, the lowest number possible of known data points is desired because the expense for test bench tests and measurements on the test bench should be reduced as much as possible.

An adapted Akaike Information Criterion in the form $$AIC_{j,C} = AIC_j + 2\frac{(p_j+1)\cdot(p_j+2)}{N-p_j-2}$$

has already been proposed for a smaller number N of data points. This adapted Akaike Information Criterion, however, delivers also unsatisfactory results for the small number of data points available. Within the meaning of the present invention, a small number of data points is understood as a number N that is comparable to the number $p_j$ of the model parameters, thus $N \approx p_j$, whereas N and $p_j$ preferably having the same order of magnitude. In particular, it is a goal of the invention to keep the number N of measured data points as low as possible in order to keep the necessary number of test bench tests or measurements on the test bench as low as possible.

Further, it is often also the case in the present application that the models $M_j$ are available as already trained models, whose model structure is completely unknown. The models $M_j$ of the model ensemble can thus partly also be present as unknown black box. The known Akaike Information Criterion AIC cannot be used on such unknown models $M_j$ for generating a model ensemble, however, because the number $p_j$ of the model parameter is not known. Because of these disadvantages of the Akaike Information Criterion AIC under the present terms and conditions (small number of available data points, possibly no knowledge about the model structure), this cannot be used, or at least not satisfactorily used, for the generation of a model ensemble.

SUMMARY

It is therefore an object of the present invention to specify a method for the generation of a model ensemble that can manage using a low number of available data points and thus a low number of test bench tests and that requires no knowledge of the model structures of the models in the model ensemble.

In order to be able to determine for such a small number of actually measured, available data points and for partially unknown models the weighting factors for a good model ensemble, according to the invention for each model an empirical complexity measurement, that evaluates over a predetermined range of input variables evaluates the deviation of the model output variables from the output variables of the actual physical process, and a model error are determined and a surface information criterion is formed from the empirical complexity measurement and the model error, from which the weighting factor for the model ensemble can be derived. The model structure is thus not evaluated as in the Akaike Information Criterion, but an empirical complexity measurement is instead used that evaluates the complexity of a model based on the deviation of the model from the underlying physical process. Not only the deviation of the measured data points (model error) is evaluated here, but also a deviation between these data points, thus over a complete input variable range, that is reflected in the empirical complexity measurement. Knowledge of the model structures of the models in the model ensemble is thus no longer necessary. Through the use of the empirical complexity measurement, the number of necessary data points can also be greatly reduced so that the time on the test bench for measuring the necessary data points can also be greatly shortened.

The model error of a jth model can be calculated simply and quickly as a mean square error between the output variables measured at an input variable (data points) of the physical process and the model output variables calculated at these input variables according to the equation $$MSE_j = \frac{1}{N}\sum_{i=1}^{N}(y(u_i) - \hat{y}_j(u_i))^2.$$

Especially advantageously, the empirical complexity measurement of a jth model is calculated using the formula $$c_j = \int_U \nabla\hat{y}_j(u)^T \nabla\hat{y}_j(u)du$$

or the formula $$c_j = \int_U \hat{y}_j(u)^T \hat{y}_j(u)du - \frac{1}{N}\sum_{i=1}^{N}\hat{y}_j(u_i)^T\hat{y}_j(u_i).$$

Using these empirical measures of complexity allows an especially good model ensemble to be determined that is in particular better than any individual model of the model ensemble.

In order to have a degree of freedom for the determination of the weighting factors, the empirical complexity measurement is preferably weighted with a complexity aversion parameter.

In a simple embodiment of the invention, the weighting factors for each model of the model ensemble can be calculated from the formula $$w_j = e^{-\frac{1}{2}SIC_j}.$$

In a particularly advantageous embodiment of the invention, it is provided that the surface information criterion is formed for the model ensemble from an error matrix that includes the model error of the models and from a complexity measurement matrix that includes the empirical complexity measurement of the models $M_j$ whereas the error matrix and the complexity measurement matrix according to the formula $SIC=\{w^T Fw+w^T Cw\}$ each being weighted twice with a weighting vector that includes the weighting factors of the model, and the surface information criterion of the model ensemble being minimized with respect to the weighting factors. Weighting factors of the model ensemble can be determined by optimization, which results in an especially small error between the model output variables of the model ensemble and the actual physical process.

It is advantageous in this context if the error matrix is calculated as a product of a matrix E, the matrix being calculated using the formula $E=(y(u_i)-\hat{y}_j(u))$.

It is especially advantageous if the complexity measurement matrix is weighted by a complexity aversion parameter because one can thereby obtain a degree of freedom by which it is possible to reduce the error between model output variables of the model ensemble and the actual process even further.

For this purpose, it can be provided in an especially advantageous embodiment of the invention that the weighting vectors for different complexity aversion parameters can be calculated and the weighting vector associated with a selected complexity aversion parameter is chosen as the optimum weighting vector for the model ensemble, or that the weighting vector for different complexity aversion parameters is calculated and the relationship $$\left\{w_{\alpha_K}^T F w_{\alpha_K} + \frac{2}{N}\sigma^2 w_{\alpha_K}^T p\right\}$$

is minimized with respect to the weighting vectors calculated for the different complexity aversion parameters in order to determine the optimum weighting vector.

BRIEF DESCRIPTION OF THE DRAWINGS

The present invention is explained below with reference to FIGS. 1 to 5, showing exemplary, schematic and non-restrictive advantageous embodiments of the invention. Shown are FIG. 1, a model ensemble having a plurality of models weighted with weighting factors, FIG. 2, the convergence of data points via different complex models, FIG. 3, the training and validation errors as a function of the number of model parameters and FIGS. 4 and 5, the effect of the calculation of weighting factors according to the invention.

DETAILED DESCRIPTION

Figure 1:
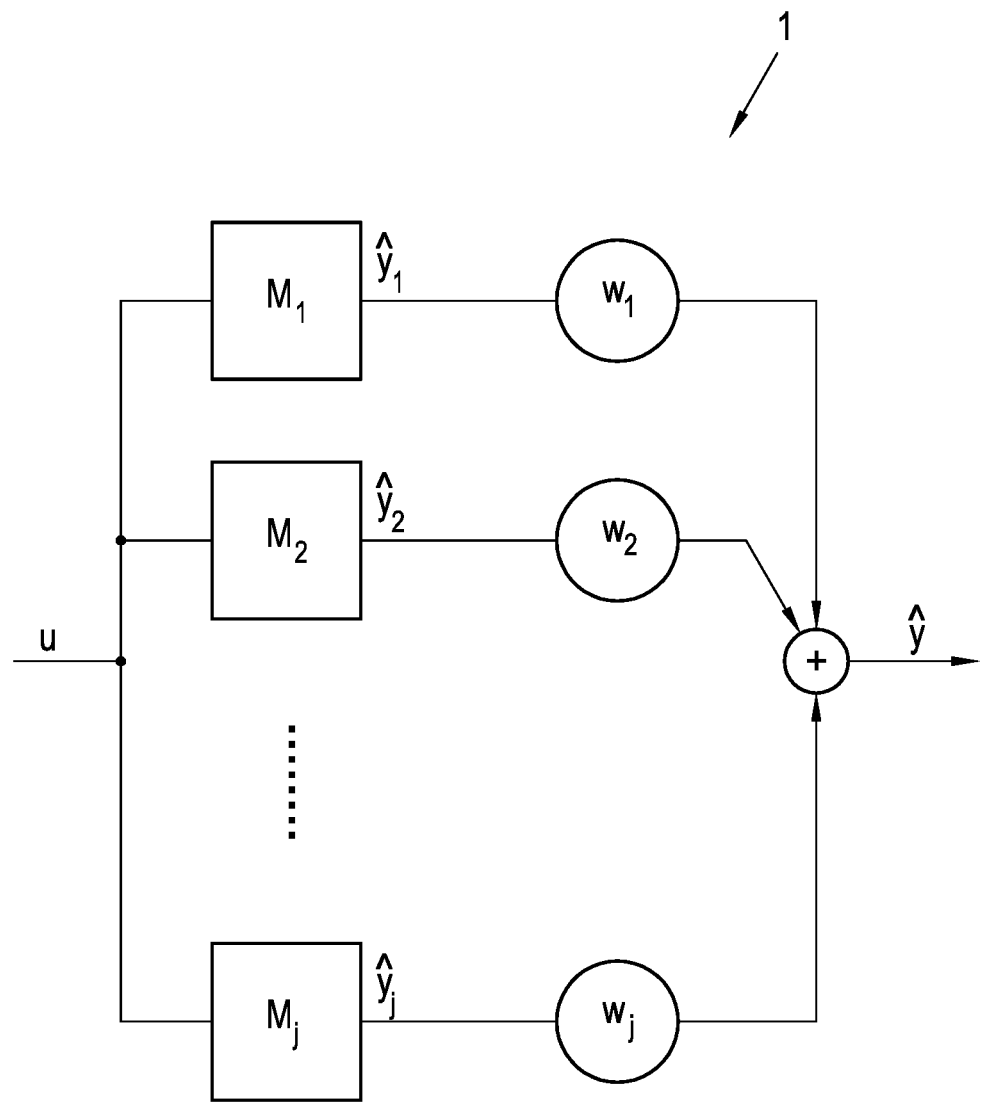

A model ensemble 1, as illustrated in FIG. 1, is made of a number j of models $M_j$. Each model $M_j$ is defined by a model structure, for example a neural network, a Kriging model, a linear model network, a polynomial, etc. and by a fixed number $p_j$ of model parameters $P_j=\{p_{1,j}, \ldots, p_{pj,j}\}$. Model parameters $P_j$ were or are trained or determined using an appropriate method and are generally known. Each model $M_j$ maps an input variable vector $u=\{u_1, \ldots, u_k\}$ onto an estimated value of the output variable $\hat{y}_j$ of the modeled physical process. The actual output variable y of the physical process, which can be measured, for example, is approximated by model $M_j$. For example, input variable u includes the input variables torque and speed of a combustion engine, as well as the engine coolant temperature of the combustion engine, and an emission or consumption variable is estimated. Input variables $u_i$ in input variable vector u can vary within a predetermined or specified input variable range U, with u∈U.

Using model ensemble 1, or models $M_j$ included therein, as a physical process e.g. an emission or consumption variable of a combustion engine, such as the NOx emission, the CO or $CO_2$ emission or the fuel consumption, is estimated as an output variable $\hat{y}$ of model ensemble 1, or as a model output variable $\hat{y}_j$ of model $M_j$. In the following description, for the sake of simplicity, a single output variable y will be assumed without limitation of general applicability, whereas an output variable vector y made up of a plurality of output variables y also being possible of course.

In model ensemble 1, each model output variable $\hat{y}_j$ is weighted with a weighting factor $w_j$ and output variable $\hat{y}$ of model ensemble 1 is the weighted sum of model output variables $\hat{y}_j$ of individual models $M_j$ in the form $$\hat{y}(u) = \sum_j w_j \hat{y}_j(u).$$

In the description, for simplicity's sake, $\hat{y}$ and $\hat{y}_j$ are also used, respectively, instead of the correct notation $\hat{y}(u)$ and $\hat{y}_j(u)$. With respect to weighting factors $w_j$, boundary conditions $w_j \in [0,1]$ and $$\sum_j w_j = 1$$

are preferably to be taken into consideration. The problem is thus presented of how to best determine weighting factors $w_j$ so that output variables y of the physical process are approximated by model ensemble 1 or by its output variable $\hat{y}$, as best as possible. The goal here, of course, is for model ensemble 1 to estimate output variable y of the physical process over the complete input variable range U, or the range of interest, better than the best model $M_j$ of model ensemble 1.

Figure 2:
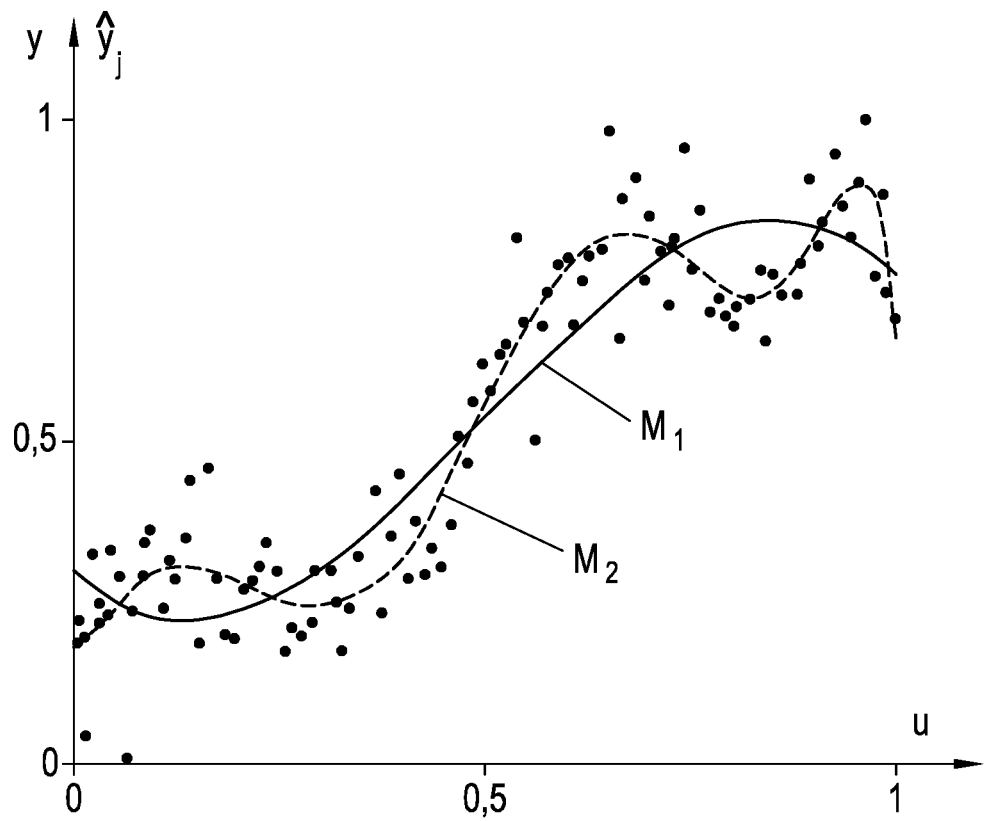

FIG. 2 shows model output variable $\hat{y}_j$ of a jth model $M_j$ as a function of a single input variable u (that is without limitation of generality the simplest case). In it the points are measured data points, thus in each case a measured output variable y(u) at an input variable u. A first model $M_1$ having the associated model output variable $\hat{y}_{j=M_1}$ approximates the measured output variable y using a simple model. Model $M_2$ with the associated model output variable $\hat{y}_{j=M_2}$, represents a somewhat more complex model that better approximates the measured output variable y (in the sense of a smaller deviation of model $M_j$ from the underlaying physical processes). The better approximation via model $M_2$, however, comes at the cost of greater model complexity due to a greater degree of freedom in modeling in the form of a larger number $p_j$ of model parameters. In general, more complex models better approximate the actual physical processes, but require more model parameters and also more data to train the model and are also more sensitive to changes in the model parameters.

Figure 3:
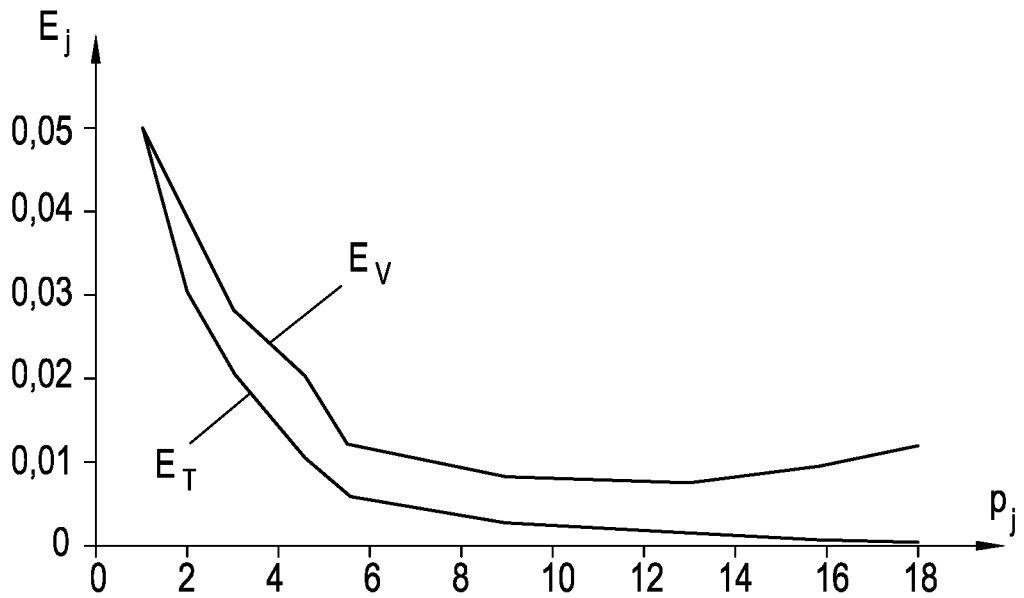

This basic relationship is illustrated in FIG. 3. In it, for example, model error E (for example MSE as above) of model $M_j$ is applied across the number of model parameters $p_j$. In one case as model error $E_T$ during the training of model $M_j$ using the available training data (all or part of the measured data points available). And the other time as model error $E_V$, which was determined using predefined validation data (preferably available measurement values of the process output y(u) at specified input variables u). For the present application, however, there is also the problem that no or very few validation data are available.

In order to evaluate the complexity of the jth model $M_j$, an empirical complexity measurement $c_j$ is used according to the invention that does not evaluate the model structure as in the prior art, but instead evaluates the deviation of model output variable $\hat{y}_j$ from the output variable y of the physical process over a specified input variable range U. In contrast to a model error E, which relates to the deviation between model $M_j$ and the physical process at specific measured data points, empirical complexity measurement $c_j$ evaluates the deviation over a complete input variable range U, thus specifically also between the measured data points. Different approaches are available for an evaluation of this sort.

In a first approach, the surface of the model output variable $\hat{y}_j$ over the input variable range U is used for evaluation. The inventive idea behind this can also be explained in reference to FIG. 2. As shown, (in a one-dimensional case illustrated here) the greater the length of the model output variable $\hat{y}_j$ (which corresponds in the generalized case to the surface) over input variable range u∈U, the more complex model $M_j$ becomes, that is, the better output variable y is thus approximated by model $M_j$. Naturally, this can be generalized to any desired dimension (number of input variables u; in input vector u). The empirical complexity measurement $c_j$ for evaluating the deviation of model $M_j$ from the physical process over input variable range U on the basis of the surface is determined according to the following relationship:

$$c_j = \int_U \nabla \hat{y}_j(u)^T \nabla \hat{y}_j(u) du.$$

In this, $\nabla$ is the known Nabla operator with respect to the input variables in the input variable vector u, therefore $$\nabla = \left( \frac{\partial}{\partial u_1}, \ldots, \frac{\partial}{\partial u_i} \right).$$

The integral is determined over a specified input variable range u∈U, preferably over the whole range. This integral increases monotonically with the surface of model output variable $\hat{y}_j$. The surface of model output variable $\hat{y}_j$ over input variable range U is thus evaluated here as empirical complexity measurement $c_j$.

As an alternative empirical complexity measurement c, which evaluates the deviation of model $M_j$ or of model output variable $\hat{y}_j$ from output variable y of the physical process, the variance of the model output variables $\hat{y}_j$ can be employed. The variance (also designated as the second moment of a random variable) is, as is well known, the expected square deviation of a random variable from its expected value. Applied to the present invention, the model output variable $\hat{y}_j$ at the available N data points is compared, using the variance, to the model output variable $\hat{y}_j$ between these data points, which is designated here as variability. The idea behind this is that a model $M_j$ having an increased variability generally predicts the basic physical process over input variable range U worse than a model $M_j$ having a lower variability. This lies in the fact that the better model $M_j$ approximates the measured data points, i.e. the more complex the model $M_j$ becomes, the greater the probability of an increased variability becomes. However, if the variability becomes too large, the risk of overfit for model $M_j$ therefore also increases. The typical behavior of such an overfilled or too-complex model $M_j$ is a greatly varying model output variable $\hat{y}_j$ over input variable range U, which in turn can lead to a larger deviation between actual output variable y and model output variable $\hat{y}_j$. This variability based on the variance can be mapped onto empirical complexity measurement $c_j$ if empirical complexity measurement $c_i$ is calculated according to the following formula.

$$c_j = \int_U \hat{y}_j(u)^T \hat{y}_j(u) du - \frac{1}{N} \sum_{i=1}^{N} \hat{y}_j(u_i)^T \hat{y}_j(u_i)$$

It is clear that there are additional possibilities for evaluating the deviation between model $M_j$ and the physical process, or output variable y of the process and the model output variable $\hat{y}_j$. The basic idea remains unaltered, namely, the idea that the larger the empirical complexity measurement $c_j$, the more complex basic model $M_j$ is. Empirical complexity measurement $c_j$ therefore also evaluates the complexity of model $M_j$.

According to the invention, a surface information criterion $SIC_j$ of jth model $M_j$ is derived from empirical complexity measurement cj, which, analogous to the above Akaike Information Criterion AIC in the prior art, is again formed from model error $E_j$ of model $M_j$ and empirical complexity measurement $c_j$, therefore $SIC_j = (E_j + \alpha_K \cdot c_j^s)$. Mean square error $$MSE_j = \frac{1}{N} \sum_{i=1}^{N} (y(u_i) - \hat{y}_j(u_i))^2,$$

for example, can again be used as model error $E_j$, wherein also any other model error $E_j$, such as in the form of the mean absolute deviation, could obviously also be used.

The preferably used parameter $\alpha_K \in [0, \infty[$ in surface information criterion $SIC_j$ is used as a complexity aversion parameter. This represents the only degree of freedom with which the complexity of model $M_j$ of model ensemble 1 can be further penalized. The larger the complexity aversion parameter $\alpha_K$ becomes, the more complexity enters into the surface information criterion $SIC_j$. Small complexity aversion parameters $\alpha_K$ therefore favor more complex models $M_j$, meaning models $M_j$ having more degrees of freedom (number of model parameters $p_j$).

Analogous to the known Akaike Information Criterion, weighting factors $w_j$ can again be determined from $$w_j = e^{-\frac{1}{2} SIC_j},$$

wherein $w_j \in [0,1]$ and $$\sum_j w_j = 1$$

can be preferably be considered as boundary conditions. Although a model ensemble 1 can already be formed by using this, which, under the given conditions, better approximates the actual process, meaning with fewer errors than a model formed using the Akaike Information Criterion AIC, the quality of model ensemble 1 can be further improved according to the invention. The method involves the approach as explained below.

It can be shown that the mean square model error MSE and the empirical complexity measurement c of model ensemble 1 with respect to a weighting vector w, which includes weighting factors $w_j$ of j models $M_j$ can each be represented as a quadratic function of model error $E_j$ and empirical complexity measurement $c_j$ of models $M_j$ in the form $SIC = \{w^T F w + \alpha_K w^T C w\}$. Within this, optional complexity aversion parameter $\alpha_K$ represents a degree of freedom in the determination of weighting factors $w_j$ of j models $M_j$.

In this context, F designates an error matrix that includes model error $E_j$ of models $M_j$ and C a complexity measurement matrix that includes empirical complexity measurement $c_j$ of models $M_j$. In the case of mean square error MSE; as model error $E_j$ and with a matrix $E = (y(u_i) - \hat{y}_j(u_i))$, for all $i \in N$ data points and j, error matrix F results as the product of matrix E with itself, according to $F = E^T E$. Depending upon the empirical complexity measurement $c_j$ chosen, complexity measurement matrix C results in, for example, $$C = \int_U \nabla \hat{y}_a(u)^T \nabla \hat{y}_a(u) du \text{ or}$$

$$C = \int_U \hat{y}_a(u)^T \hat{y}_a(u) du - \frac{1}{N} \sum_{i=1}^N \hat{y}_a(u_i)^T \hat{y}_a(u_i),$$

each having model output variable vector $\hat{y}_a$, which contains model output variables $\hat{y}_j$ of j models, thus $\hat{y}_a = \{\hat{y}_1 \ldots \hat{y}_j\}$. Matrices F and C can thus be calculated in advance and, above all, without knowledge of models $M_j$ or their model structure or the number of model parameters $p_j$.

For determining weighting factors $w_j$ (or, analogously, weighting vector w), surface information criterion SIC of model ensemble 1 for a specified complexity aversion parameter $\alpha_K$ can be optimized with regard to weighting factors $w_j$, in particular minimized. An optimization problem in the form $$w_\alpha = \arg\min_w \{w^T F w + \alpha_K w^T C w\}$$

can be derived from this.

As can be easily recognized, this is a quadratic optimization problem that can be solved quickly and efficiently using available standard solution algorithms for a predetermined complexity aversion parameter $\alpha_K$, $w_j \in [0,1]$ and $$\sum_j w_j = 1$$

preferably apply as boundary conditions for optimization. Any initial weighting vector w can be specified.

Figure 4:
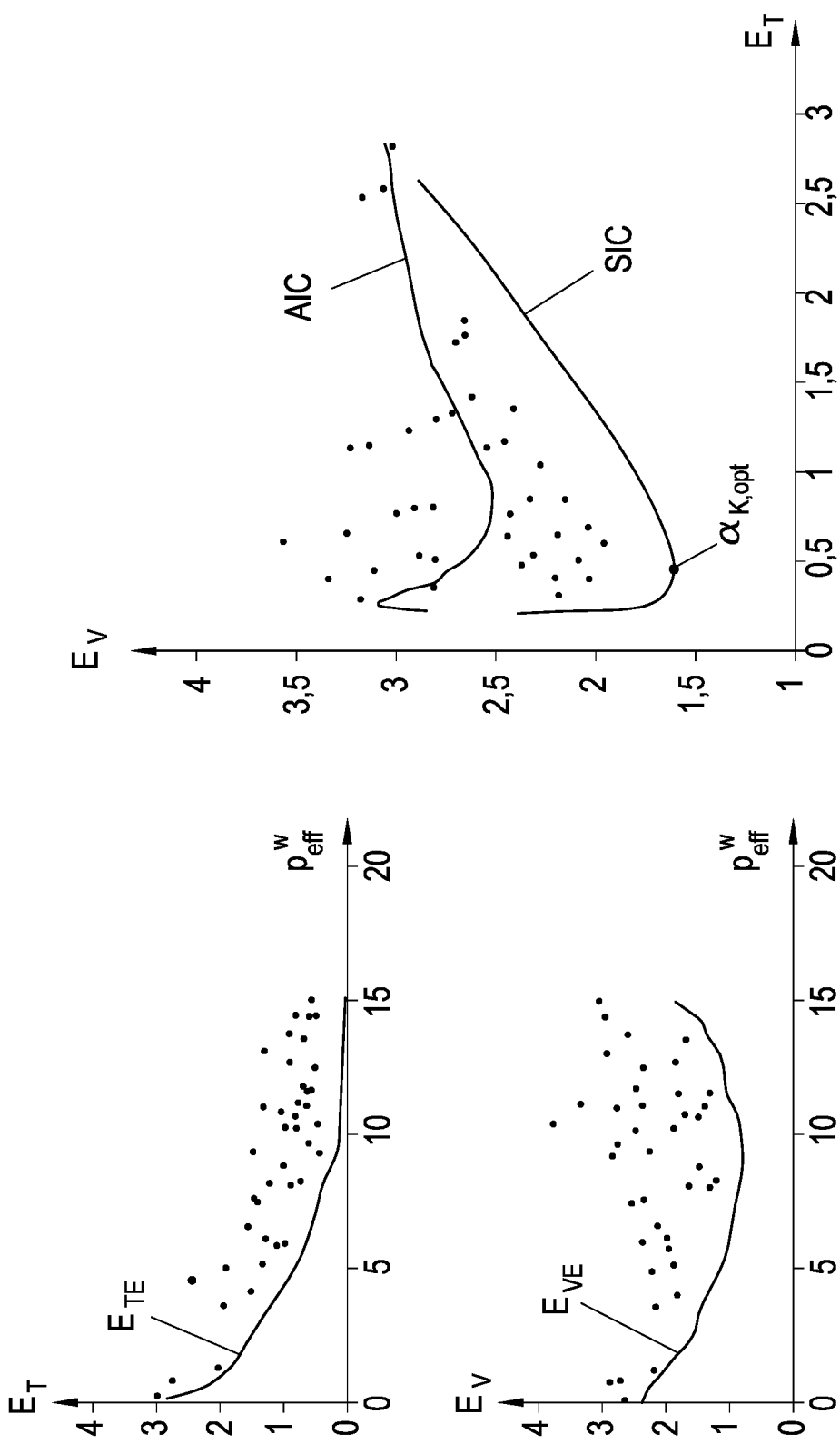

The result of the optimization of Surface Information Criterion SIC of model ensemble 1 for determination of weighting factors $w_j$ is described in reference to FIG. 4. The exemplary embodiment is based on j models $M_j$ trained using a small number of data points. Within this, the two diagrams to the left show training error $E_{TE}$ and validation error $E_{VE}$ of model ensemble 1, which is determined using the optimization of surface information criterion SIC described above. Plotted on the abcissa is an empirical model ensemble complexity $p_{eff}^w$, which is derived from the complexities of each model $M_j$ in the form $p_{eff}^w = w^T p$. w is the weighting vector determined for a specified complexity aversion parameter $\alpha_K$, and vector p includes the number of model parameters $p_j$ for every model $M_j$. If complexity aversion parameter $\alpha_K$ is varied and optimization is resolved for each complexity aversion parameter $\alpha_K$, whereby one obtains an associated weighting vector $w_{\alpha_K}$ for each, one obtains the curves in the two diagrams to the left. The points in the diagram respectively represent training error $E_{Tj}$ and validation error $E_{vj}$ of a jth model $M_j$ of model ensemble 1 (the number $p_j$ of the model parameter of the jth model $M_j$ is applied for this in each case). As can easily be recognized, model ensemble 1 determined according to the invention is always better in each case, meaning having smaller errors, than the best single model $M_j$.

In FIG. 4, validation error $E_V$ is represented as a function of training error $E_T$ by the diagram on the right. The points again represent the individual models $M_j$. In this, model ensemble 1 that is determined using the standard Akaike Information Criterion AIC is also compared to model ensemble 1 that is determined according to the invention using the surface information criterion SIC. As can be clearly recognized, surface information criterion SIC not only performs far better than Akaike Information Criterion AIC, but also better than each individual model $M_j$.

It can also be deduced from the diagram on the right in FIG. 4 that there is a complexity aversion parameter $\alpha_{K,opt}$ that minimizes the model error of model ensemble 1. It can now be attempted to manually find this optimum complexity aversion parameter $\alpha_{K,opt}$ or at least to manually approximate it. In a second step following the optimization of surface information criterion SIC, an attempt can also be made, however, to determine optimum complexity aversion parameter $\alpha_{K,opt}$, and thus also the associated optimum weighting vector $w_{opt}$, with the procedure being described below.

To accomplish this, the associated weighting vectors $w_{\alpha_K}$ are first determined for a plurality of complexity aversion parameters $\alpha_K$. A set of weighting vectors is thus obtained $$\{w_{\alpha_K}\}_{\alpha_K \geq 0}.$$

Using the known Mallow equation, complexity aversion parameter $\alpha_K$ is chosen as optimum complexity aversion parameter $\alpha_{K,opt}$, which solves the following optimization problem $$w_{opt} = \arg\min_{w_{\alpha_K}} \left\{ w_{\alpha_K}^T F w_{\alpha_K} + \frac{2}{N}\sigma^2 w_{\alpha_K}^T p \right\}.$$

Within this, F is again the error matrix ($F=E^TE$) and a is the standard deviation of the available data points, but which is generally not known. There are, however, known methods (as described in Hansen, B. E. "Least squares model averaging," Econometrica, 75(4), 2007, pp. 1175-1189, for example) to estimate the standard deviation σ from the available data points. Vector p again includes for all j models $M_j$ the number of model parameters $p_j$. The knowledge of models $M_j$ or their model structures is, therefore, required for this step.

This optimization is not, however, solved directly, but with respect to the initially determined set of weighting vectors $$\{w_{\alpha_K}\}_{\alpha_K \geq 0}.$$

This means that there is selected the weighting vector w associated to a specific complexity aversion parameter $\alpha_K$ as optimum weighting vector $w_{opt}$, which yields the minimal expression $$\left\{ w_{\alpha_K}^T F w_{\alpha_K} + \frac{2}{N}\sigma^2 w_{\alpha_K}^T p \right\}.$$

Figure 5:
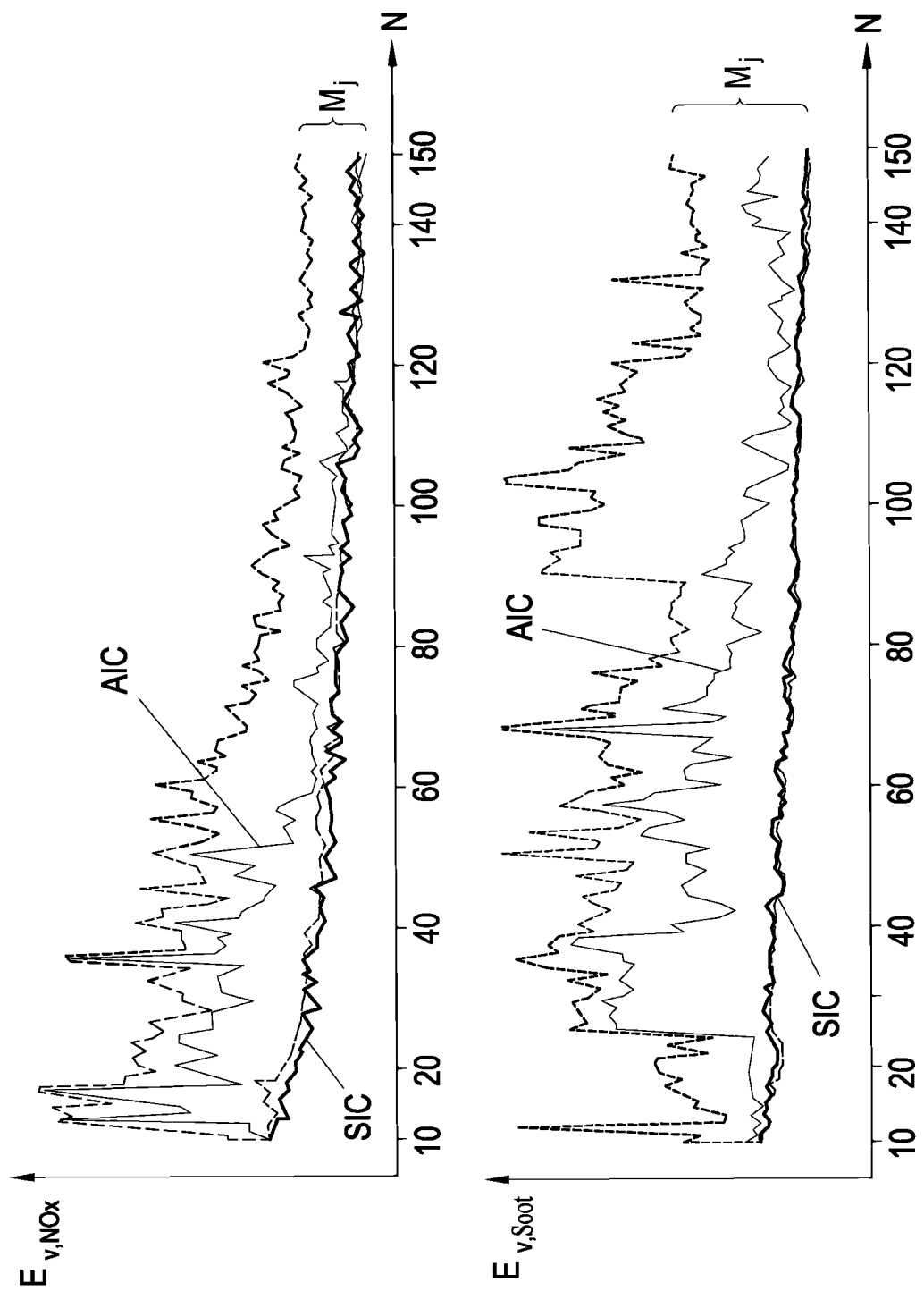

In FIG. 5, the effect of the method according to the invention for determining weighting factors $w_j$ for a small number N of available data points is demonstrated using an example. To do this, 5,000 data points for NOx emission as well as for soot emission are measured on a specific combustion engine, thus in each case a measurement value for NOx and soot at 5,000 input vectors u, in order to have sufficient data for the demonstration example. Input vector u incorporated here, for example, five input variables $u_i$, namely torque, speed, engine coolant temperature, position of a turbocharger having variable turbine geometry and position of an exhaust gas recirculation. Fifteen different models $M_j$ (different model structures and/or different number of model parameters and/or different model parameters) were trained using a random selection of data points from the 5,000 available data points. The random selection was used as a small number N of available data points. Number N of available data points was thereby increased from 10 to 150, thus $10 \leq N \leq 150$. The data points remaining in each case (5,000-N) were used as validation data for validation of the example in order to verify the effectiveness of the invention. In FIG. 5, the validation error for NOx emission $E_{V,NOx}$ and soot emission $E_{V,Soot}$ is illustrated for each case. Validation error $E_V$ is the mean square error between model output variable $\hat{y}_j$ or output variable $\hat{y}$ of model ensemble 1 and the validation data. For each number N of data points, a best and a worst model $M_k$ results (dashed lines in FIG. 5). This bandwidth of model $M_j$ is represented in FIG. 5. In addition, for each number N of data points, a model ensemble according to the known Akaike Information Criterion AIC and a model ensemble 1 using the surface information criterion SIC according to the invention were determined. The validation errors for this are shown in the diagrams in FIG. 5, as well. It is immediately obvious from this that model ensemble 1 determined according to the invention is not only usually better than the best model $M_j$ in each case, but also better than the model ensemble that was determined using Akaike Information Criterion AIC.

A model ensemble determined according to the invention is used, for example, for calibrating a technical system, such as a combustion engine. In the calibration—in order to optimize at least one output variable of the technical system—control variables of the technical system, by which the technical system is controlled, are varied in a specified operational state of the technical system that is defined by state variables or a state variable vector. The optimization of output variables by variation of the control variables is generally formulated and solved as an optimization problem. There are sufficient known methods for accomplishing this. The control variables determined in this manner are stored as a function of the respective operational conditions, for example in the form of characteristic maps or tables. This relationship can then be used to control the technical system as a function of the actual operational state (which is measured or otherwise determined (for example, estimated)). This means that the stored control variables for the relevant operational state are readout from the stored relationship and used to control the technical process. In the case of a combustion engine as technical system, the operational condition is often described using measurable variables such as speed and torque, wherein other variables such as engine coolant temperature, ambient temperature, etc., can also be used. In a combustion engine, the position of a variable-turbine-geometry turbocharger, the position of an exhaust-gas recirculation system or the injection timing are often used as control variables. The output variable to be optimized in a combustion engine is typically the consumption and/or emission variable (for example, NOx, CO, $CO_2$, etc.). Calibration of a combustion engine thus ensures by setting correct control variables that consumption and/or emission during operation are minimal.

The invention claimed is:

1. A method for calibrating a technical system controllable by control variables with a model ensemble, that estimates at least one output variable (y) of the technical system as a function of at least one input variable (u), comprising:
    forming the model ensemble from a sum of model outputs ($\hat{y}_j$) from a plurality (j) of models ($M_j$) that have been weighted with a weighting factor ($w_j$),
    determining for each model ($M_j$) an empirical complexity measurement ($c_j$), that evaluates the deviation of the model output variable ($\hat{y}_j$) from the output variable (y) of the actual physical process over a specified input variable range (U), and a model error ($E_j$), wherein the empirical complexity measurement ($c_j$) is weighted with a complexity aversion parameter ($a_K$),
    forming a surface information criterion ($SIC_j$, SIC) from the empirical complexity measurement ($c_j$) and the model error ($E_j$) from which the weighting factor ($w_j$) for the model ensemble is determined,
    calibrating the technical system using the model ensemble by setting the control variables of the technical system to ensure an optimized at least one output variable (y) of the technical system during operation.

2. The method according to claim 1, wherein the mean square error ($MSE_j$) between the output variables (y) of the physical process measured at N input variables (u) and the model output variables calculated at these N input variables is used as model error ($E_j$) of a model ($M_j$) according to the relationship $$MSE_j = \frac{1}{N}\sum_{i=1}^{N}(y(u_i)-\hat{y}_j(u_i))^2.$$

3. The method according to claim 1, wherein the empirical complexity measurement ($c_j$) of a model ($M_j$) is calculated using the formula $$c_j = \int_U \nabla\hat{y}_j(u)^T \nabla\hat{y}_j(u)du$$

or the formula $$c_j = \int_U \hat{y}_j(u)^T \hat{y}_j(u)du - \frac{1}{N}\sum_{i=1}^{N}\hat{y}_j(u_i)^T\hat{y}_j(u_i).$$

4. The method according to claim 1, wherein the weighting factors ($w_j$) of each model ($M_j$) of the model ensemble are calculated using the surface $$w_j = e^{-\frac{1}{2}SIC_j}.$$

information criterion ($SIC_j$) of the model ($M_j$) from the formula.

5. The method according to claim 1, wherein for the model ensemble the surface information criterion (SIC) is formed from an error matrix (F) that includes the model error ($E_j$) of the models ($M_j$) and a complexity measurement matrix (C) that includes the empirical complexity measurement ($c_j$) of the models ($M_j$), whereas the error matrix (F) and the complexity measurement matrix (C) according to the formula $SIC=\{w^TFw+w^TCw\}$ each being weighted twice using a weighting vector (w) that includes the weighting factors ($w_j$) of the models ($M_j$), and the surface information criterion (SIC) of the model ensemble being minimized with respect to the weighting factors ($w_j$).

6. The method according to claim 5, wherein the error matrix (F) is calculated as a matrix product of a matrix (E), whereas the matrix (E) being calculated using the formula $E=(y(u_i)-\hat{y}_j(u_j))$.

7. The method according to claim 5, wherein the complexity measurement matrix (C) is weighted using a complexity aversion parameter ($a_K$).

8. The method according to claim 7, wherein the weighting factors ($w_j$) are calculated for different complexity aversion parameters ($a_K$) and the weighting vector ($w_{a_k}$) belonging to a selected complexity aversion parameter ($a_K$) is chosen as the optimum weighting vector ($w_{opt}$) for the model ensemble.

9. The method according to claim 7, wherein weighting vectors ($w_{a_k}$) are calculated for different complexity aversion parameters ($a_K$) and, in order to determine the optimum weighting vector ($w_{opt}$), the relationship $$\left\{w_{a_K}^T F w_{a_K} + \frac{2}{N}\sigma^2 w_{a_K}^T p\right\}$$

is minimized with respect to the weighting vectors ($w_{a_k}$) calculated for the different complexity aversion parameters ($a_K$).

10. The method according to claim 6, wherein the complexity measurement matrix (C) is weighted using a complexity aversion parameter ($a_K$).

11. A combustion engine comprising a control device calibrated by a model ensemble generated by the method of claim 1.

12. The method according to claim 1, wherein the output variable comprises an emission variable.

13. A method of calibrating a technical system controllable by control variables using a model ensemble that estimates an output variable of the technical system as a function of an input variable, comprising:
  forming the model ensemble from a sum of model outputs of a plurality of models that have been weighted with a weighting factor;
  determining an empirical complexity measurement for each of the plurality of models that evaluates a deviation of the model output from the output variable over a specified input variable range, wherein the empirical complexity measurement is weighted with a complexity aversion parameter;
  determining a model error for each of the plurality of models;
  forming a surface information criterion from the empirical complexity measurement and the model error from which the weighting factor is determined;
  calibrating the technical system using the model ensemble by setting the control variables of the technical system to ensure an optimized output variable of the technical system during operation.

14. A combustion engine comprising a control device calibrated by the method of claim 13.

15. The method according to claim 13, wherein the output variable comprises an emission variable.

* * * * *